(12) United States Patent
Sprague et al.

(10) Patent No.: US 8,456,589 B1
(45) Date of Patent: Jun. 4, 2013

(54) DISPLAY DEVICE ASSEMBLY

(75) Inventors: Robert A. Sprague, Saratoga, CA (US);
Bryan Hans Chan, San Francisco, CA (US); Craig Lin, San Jose, CA (US);
Tin Pham, San Jose, CA (US); Manasa Peri, Milpitas, CA (US)

(73) Assignee: SiPix Imaging, Inc., Fremont, CA (US)

( * ) Notice: Subject to any disclaimer, the term of this patent is extended or adjusted under 35 U.S.C. 154(b) by 148 days.

(21) Appl. No.: 12/843,396

(22) Filed: Jul. 26, 2010

Related U.S. Application Data

(60) Provisional application No. 61/228,875, filed on Jul. 27, 2009.

(51) Int. Cl.
*G02F 1/1335* (2006.01)
(52) U.S. Cl.
USPC .......................................................... 349/63
(58) Field of Classification Search
USPC .......................................................... 349/63
See application file for complete search history.

(56) References Cited

U.S. PATENT DOCUMENTS

| | | | |
|---|---|---|---|
| 4,083,626 A | 4/1978 | Miyahara et al. |
| 5,151,801 A | 9/1992 | Hiroshima |
| 6,144,430 A | 11/2000 | Kuo |
| 6,166,787 A | 12/2000 | Akins et al. |
| 6,277,263 B1 | 8/2001 | Chen |
| 6,327,013 B1 | 12/2001 | Tombling et al. |
| 6,556,261 B1 | 4/2003 | Krusius et al. |
| 6,565,729 B2 | 5/2003 | Chen et al. |
| 6,753,647 B2 | 6/2004 | Kim |
| 6,784,962 B2 | 8/2004 | Sumida et al. |
| 6,930,818 B1 | 8/2005 | Liang et al. |
| 6,940,569 B2 * | 9/2005 | Tanaka et al. ............... 349/58 |
| 6,997,595 B2 | 2/2006 | Mi et al. |
| 7,061,569 B2 | 6/2006 | Yun et al. |
| 7,088,404 B2 | 8/2006 | Otake et al. |
| 7,160,017 B2 | 1/2007 | Lee et al. |
| 7,184,188 B2 | 2/2007 | Kamijima |
| 7,244,476 B2 | 7/2007 | Sumida et al. |
| 7,248,394 B2 | 7/2007 | Ding et al. |
| 7,286,197 B2 | 10/2007 | Kwon et al. |
| 7,294,866 B2 | 11/2007 | Liu |
| 7,332,066 B2 | 2/2008 | Chen et al. |
| 7,339,716 B2 | 3/2008 | Ding et al. |
| 7,342,556 B2 | 3/2008 | Oue et al. |
| 7,397,619 B2 | 7/2008 | Hwang et al. |

(Continued)

FOREIGN PATENT DOCUMENTS

| | | | |
|---|---|---|---|
| JP | 2001134204 | * | 5/2001 |
| JP | 2001-264819 | | 9/2001 |

(Continued)

OTHER PUBLICATIONS

Translation of JP2001134204 May 2001.*

(Continued)

*Primary Examiner* — Phu Vu
(74) *Attorney, Agent, or Firm* — Perkins Coie LLP

(57) ABSTRACT

The present invention is directed to a display device which comprises a display device, a mechanical light and optionally a luminance enhancement structure. This type of display device assembly is particularly useful for e-books comprising a luminance enhancement structure designed to direct a significant amount of light towards the reader of the e-books.

13 Claims, 16 Drawing Sheets

U.S. PATENT DOCUMENTS

| | | | |
|---|---|---|---|
| 7,408,696 | B2 | 8/2008 | Liang et al. |
| 7,463,317 | B2 | 12/2008 | Takizawa et al. |
| 7,543,973 | B2 | 6/2009 | Shimura |
| 7,564,519 | B2 | 7/2009 | Takizawa |
| 7,576,914 | B2 | 8/2009 | Goto |
| 7,612,846 | B2 | 11/2009 | Takizawa et al. |
| 7,638,808 | B2 | 12/2009 | Owen et al. |
| 7,667,785 | B2 | 2/2010 | Van Gorkom et al. |
| 7,693,389 | B2 | 4/2010 | Kamijima |
| 2001/0006409 | A1 | 7/2001 | Lee |
| 2001/0026347 | A1 | 10/2001 | Sawasaki et al. |
| 2001/0026445 | A1* | 10/2001 | Naghi et al. ............... 362/85 |
| 2002/0033927 | A1 | 3/2002 | Mun et al. |
| 2002/0057413 | A1 | 5/2002 | Sumida et al. |
| 2003/0165016 | A1 | 9/2003 | Whitehead et al. |
| 2003/0234900 | A1 | 12/2003 | Kim |
| 2004/0223100 | A1 | 11/2004 | Kotchick et al. |
| 2005/0003108 | A1 | 1/2005 | Sumida et al. |
| 2005/0041311 | A1 | 2/2005 | Mi et al. |
| 2005/0140846 | A1 | 6/2005 | Lubart et al. |
| 2005/0141844 | A1 | 6/2005 | Olczak |
| 2006/0034099 | A1 | 2/2006 | Yang et al. |
| 2006/0055627 | A1 | 3/2006 | Wilson |
| 2006/0103779 | A1 | 5/2006 | Amemiya et al. |
| 2006/0291247 | A1 | 12/2006 | Kao et al. |
| 2007/0063965 | A1 | 3/2007 | Kawai |
| 2007/0152592 | A1 | 7/2007 | Kim et al. |
| 2007/0160811 | A1 | 7/2007 | Gaides et al. |
| 2007/0200975 | A1 | 8/2007 | Kamijima |
| 2007/0253072 | A1 | 11/2007 | Mullen et al. |
| 2008/0012034 | A1 | 1/2008 | Thielen et al. |
| 2009/0097273 | A1 | 4/2009 | Chang |
| 2009/0231245 | A1 | 9/2009 | Lin |
| 2010/0141573 | A1 | 6/2010 | Lin |
| 2010/0177396 | A1 | 7/2010 | Lin |
| 2010/0182351 | A1 | 7/2010 | Lin |
| 2010/0271407 | A1 | 10/2010 | Ho et al. |
| 2011/0043894 | A1 | 2/2011 | Sprague et al. |
| 2011/0057927 | A1 | 3/2011 | Lin |

FOREIGN PATENT DOCUMENTS

| | | |
|---|---|---|
| WO | WO 01/67170 | 9/2001 |
| WO | WO 2008/122927 | 10/2008 |
| WO | WO 2009/1144361 | 9/2009 |

OTHER PUBLICATIONS

U.S. Appl. No. 12/323,300, filed Nov. 25, 2008, Sprague et al.

U.S. Appl. No. 12/323,315, filed Nov. 25, 2008, Sprague et al.

U.S. Appl. No. 12/719,702, filed Mar. 8, 2010, Lin et al.

Allen, K. (Oct. 2003). Electrophoretics Fulfilled. *Emerging Displays Review: Emerging Display Technologies, Monthly Report*—Oct. 2003, 9-14.

Bardsley, J.N. & Pinnel, M.R. (Nov. 2004) Microcup™ Electrophoretic Displays. *USDC Flexible Display Report*, 3.1.2. pp. 3-12-3-16.

Chaug, Y.S., Haubrich, J.E., Sereda, M. and Liang, R.C. (Apr. 2004). Roll-to-Roll Processes for the Manufacturing of Patterned Conductive Electrodes on Flexible Substrates. *Mat. Res. Soc. Symp. Proc.*, vol. 814, I9.6.1.

Chen, S.M. (Jul. 2003) The Applications for the Revolutionary Electronic Paper Technology. *OPTO News & Letters*, 102, 37-41, (in Chinese, English abstract attached).

Chen, S.M. (May 2003) The New Application and the Dynamics of Companies. *TRI.* 1-10. (in Chinese, English abstract attached).

Chung, J., Hou, J., Wang, W., Chu, L.Y., Yao, W., & Liang, R.C. (Dec. 2003). Microcup® Electrophoretic Displays, Grayscale and Color Rendition. *IDW, AMD2/EP1-2*, 243-246.

Ho, Andrew. (Nov. 2006) *Embedding e-Paper in Smart Cards, Pricing Labels & Indicators*. Presentation conducted at Smart Paper Conference Nov. 15-16, 2006, Atlanta, GA, USA.

Ho, C,& Liang, R.C. (Dec. 2003). *Microcup® Electronic Paper by Roll-to-Roll Manufacturing Processes*. Presentation conducted at FEG, Nei-Li, Taiwan.

Ho, Candice. (Feb. 1, 2005) *Microcupt® Electronic Paper Device and Applicaiton*. Presentation conducted at USDC 4th Annual Flexible Display Conference 2005.

Hou, J., Chen, Y., Li, Y., Weng, X., Li, H. And Pereira, C. (May 2004). Reliability and Performance of Flexible Electrophoretic Displays by Roll-to-Roll Manufacturing Processes. *SID Digest*, 32.3, 1066-1069.

Kao, WC., (Feb. 2009) Configurable Timing Controller Design for Active Matrix Electrophoretic Dispaly. *IEEE Transactions on Consumer Electronics*, 2009, vol. 55, Issue 1, pp. 1-5.

Kao, WC., Fang, CY., Chen, YY., Shen, MH., and Wong, J. (Jan. 2008) Integrating Flexible Electrophoretic Display and One-Time Password Generator in Smart Cards. *ICCE 2008 Digest of Technical Papers*, P4-3. (Int'l Conference on Consumer Electronics, Jan. 9-13, 2008).

Kao, WC., Ye, JA., and Lin, C. (Jan. 2009) Image Quality Improvement for Electrophoretic Displays by Combining Contrast Enhancement and Halftoning Techniques. *ICCE 2009 Digest of Technical Papers*, 11.2-2.

Kao, WC., Ye, JA., Chu, MI., and Su, CY. (Feb. 2009) Image Quality Improvement for Electrophoretic Displays by Combining Contrast Enhancement and Halftoning Techniques. *IEEE Transactions on Consumer Electronics*, 2009, vol. 55, Issue 1, pp. 15-19.

Kao, WC., Ye, JA., Lin, FS., Lin, C., and Sprague, R. (Jan. 2009) Configurable Timing Controller Design for Active Matrix Electrophoretic Display with 16 Gray Levels. *ICCE 2009 Digest of Technical Papers*, 10.2-2.

Lee, H., & Liang, R.C. (Jun. 2003) SiPix Microcup® Electronic Paper—An Introduction. *Advanced Display*, Issue 37, 4-9 (in Chinese, English abstract attached).

Liang, R.C. (Feb. 2003) *Microcup® Electrophoretic and Liquid Crystal Displays by Roll-to-Roll Manufacturing Processes*. Presentation conducted at the Flexible Microelectronics & Displays Conference of U.S. Display Consortium, Phoenix, Arizona, USA.

Liang, R.C. (Apr. 2004). *Microcup Electronic Paper by Roll-to-Roll Manufacturing Process*. Presentation at the Flexible Displays & Electronics 2004 of Intertech, San Fransisco, California, USA.

Liang, R.C. (Oct. 2004) *Flexible and Roll-able Displays/Electronic Paper—A Technology Overview*. Paper presented at the METS 2004 Conference in Taipie, Taiwan.

Liang, R.C., & Tseng, S. (Feb. 2003). *Microcup® LCD, A New Type of Dispersed LCD by a Roll-to-Roll Manufacturing Process*. Paper presented at the IDMC, Taipei, Taiwan.

Liang, R.C., (Feb. 2005) *Flexible and Roll-able Displays/Electronic Paper— A Brief Technology Overview*. Flexible Display Forum, 2005, Taiwan.

Liang, R.C., Hou, J., & Zang, H.M. (Dec. 2002) Microcup Electrophoretic Displays by Roll-to-Roll Manufacturing Processes. *IDW*, EP2-2, 1337-1340.

Liang, R.C., Hou, J., Chung, J., Wang, X., Pereira, C., & Chen, Y. (May 2003). Microcup® Active and Passive Matrix Electrophoretic Displays by a Roll-to-Roll Manufacturing Processes. *SID Digest*, vol. 34, Issue 1, pp. 838-841, 20.1.

Liang, R.C., Hou, J., Zang, H.M., & Chung, J. (Feb. 2003). *Passive Matrix Microcup® Electrophoretic Displays*. Paper presented at the IDMC, Taipei, Taiwan.

Liang, R.C., Hou, J., Zang, H.M., Chung, J., & Tseng, S. (2003). Microcup® displays : Electronic Paper by Roll-to-Roll Manufacturing Processes. *Journal of the SID*, 11(4), 621-628.

Liang, R.C., Zang, H.M., Wang, X., Chung, J. & Lee, H., (Jun./Jul. 2004) "Format Flexible Microcup® Electronic Paper by Roll-to-Roll Manufacturing Process", Presentation conducted at the 14th FPD Manufacturing Technology EXPO & Conference.

Nikkei Microdevices. (Dec. 2002) Newly-Developed Color Electronic Paper Promises—Unbeatable Production Efficiency. *Nikkei Microdevices*, p. 3, (in Japanese, with English translation).

Sprague, R.A. (Sep. 23, 2009) SiPix Microcup Electrophoretic Epaper for Ebooks. *NIP 25 Technical Programs and Proceedings*, 2009 pp. 460-462.

Wang, X., Kiluk, S., Chang, C., & Liang, R.C. (Feb. 2004). Mirocup® Electronic Paper and the Converting Processes. *ASID*, 10.1.2-26, 396-399, Nanjing, China.

Wang, X., Kiluk, S., Chang, C., & Liang, R.C., (Jun. 2004) Microcup® Electronic Paper and the Converting Processes. *Advanced Display*, Issue 43, 48-51 (in Chinese, with English abstract).

Wang, X., Li, P., Sodhi, D., Xu, T. and Bruner, S. et al., (Feb. 2006) *Inkjet Fabrication of Multi-Color Microcup® Electrophorectic Display*. The Flexible Microelectronics & Displays Conference of U.S. Display Consortium.

Wang, X., Zang, HM., and Li, P. (Jun. 2006) Roll-to-Roll Manufacturing Process for Full Color Electrophoretic film. *SID Digest*, 00pp. 1587-1589.

Zang, H.M, Hwang, J.J., Gu, H., Hou, J., Weng, X., Chen, Y., et al. (Jan. 2004). Threshold and Grayscale Stability of Microcup® Electronic Paper. *Proceeding of SPIE-IS&T Electronic Imaging, SPIE* vol. 5289, 102-108.

Zang, H.M. & Hou, Jack, (Feb. 2005) *Flexible Microcup® EPD by RTR Process*. Presentation conducted at 2$^{nd}$ Annual Paper-Like Displays Conference, Feb. 9-11, 2005, St. Pete Beach, Florida.

Zang, H.M. (Oct. 2003). *Microcup® Electronic Paper by Roll-to-Roll Manufacturing Processes*. Presentation conducted at the Advisory Board Meeting, Bowling Green State University, Ohio, USA.

Zang, H.M. (Feb. 2004). *Microcup Electronic Paper*. Presentation conducted at the Displays & Microelectronics Conference of U.S. Display Consortium, Phoenix, Arizona, USA.

Zang, H.M., & Liang, R.C. (2003) Microcup Electronic Paper by Roll-to-Roll Manufacturing Processes. *The Spectrum*, 16(2), 16-21.

Zang, HM., (Feb. 2007) *Developments in Microcup® Flexible Displays*. Presentation conducted at the 6th Annual Flexible Display and Microelectronics Conference, Phoenix, AZ Feb. 6-8.

Zang, HM., (Sep. 2006) *Monochrome and Area Color Microcup®EPDs by Roll-to-Roll Manufacturing Process*. Presentation conducted at the Forth Organic Electronics Conference and Exhibition (OEC-06), Sep. 25-27, 2006, Frankfurt, Germany.

Zang, HM., Wang, F., Kang, Y.M., Chen, Y., and Lin, W. (Jul. 2007) *Microcup® e-Paper for Embedded and Flexible Designs*. IDMC'07, Taipei International Convention Center, Taiwan.

Zang, HM., Wang, W., Sun, C., Gu, H., and Chen, Y. (May 2006) Monochrome and Area Color Microcup® EPDs by Roll-to-Roll Manufacturing Processes. *ICIS '06 International Congress of Imaging Science Final Program and Proceedings*, pp. 362-365.

U.S. Appl. No. 12/837,350, filed Jul. 15, 2010 Sprague et al.

* cited by examiner

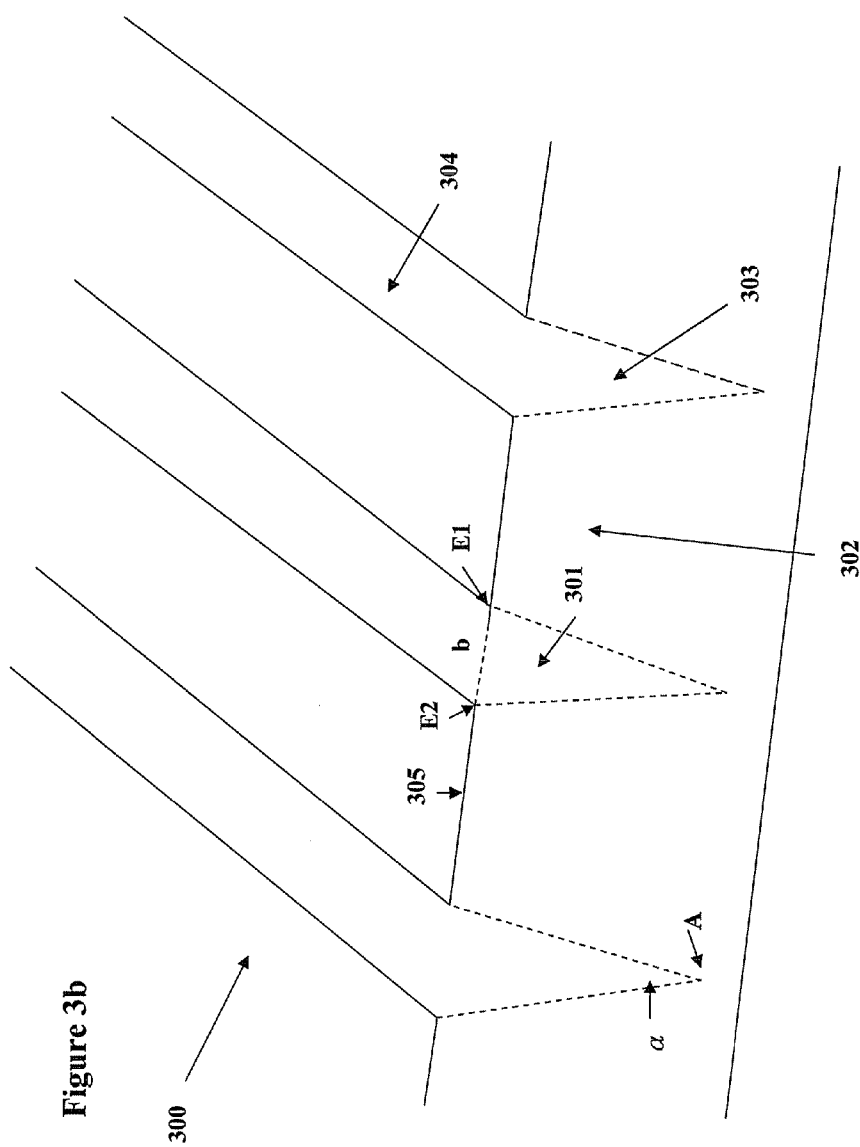

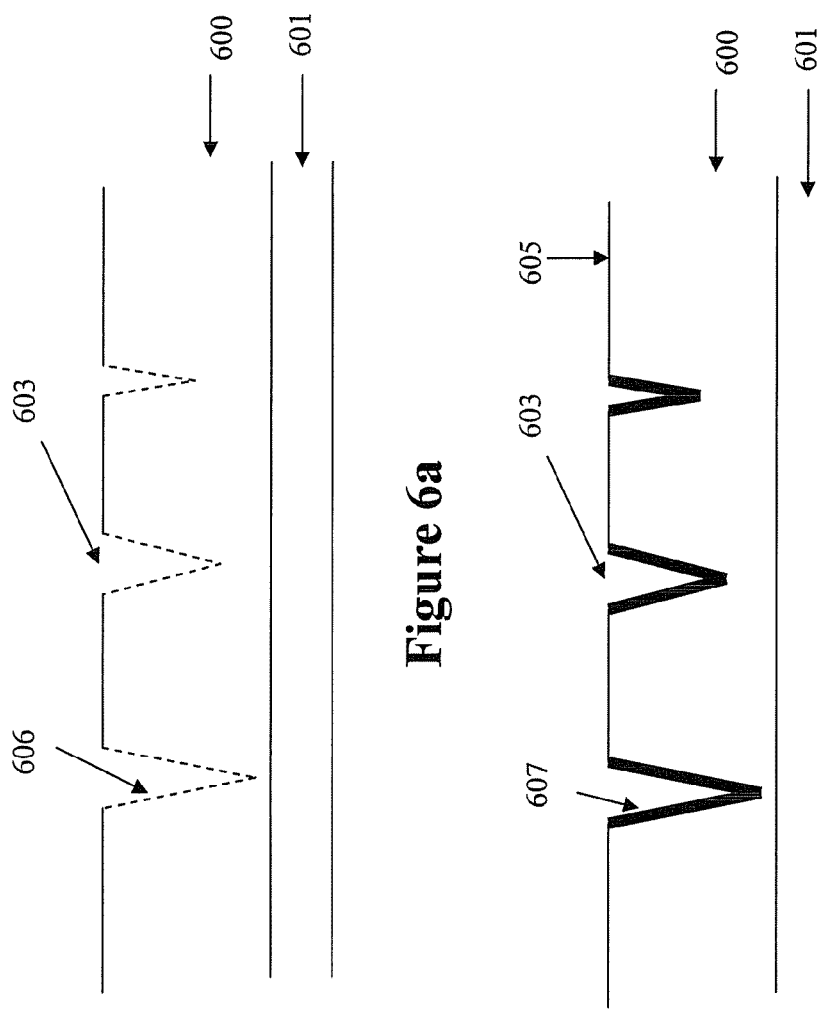

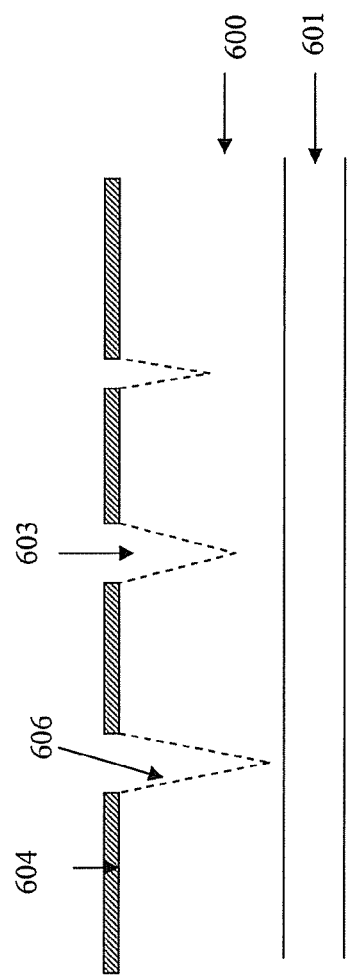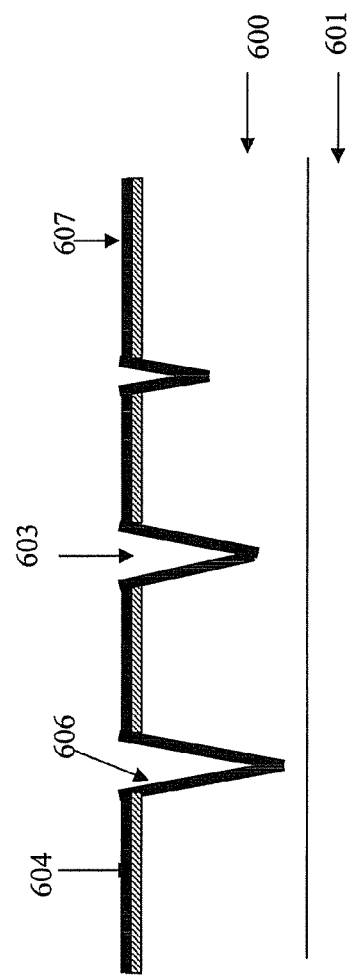

DISPLAY DEVICE ASSEMBLY

This application claims priority to U.S. Provisional Application No. 61/228,875, filed Jul. 27, 2009; the content of which is incorporated herein by reference in its entirety.

FIELD OF THE INVENTION

The present invention is directed to a display device assembly which comprises a display device, a mechanical light and optionally a luminance enhancement structure.

BACKGROUND OF THE INVENTION

Reflective displays require a front light system to facilitate viewing of images displayed. The front lighting for reflective displays normally consists of a light guide film attached to the front surface of the display. This light guide film has an illumination source placed at the edge of the light guide film and the light is guided within the film by total internal reflection of the surface along the light guide film, so that the light crosses the front of the display. Part of the surface of the light guide has a light scattering structure which causes light inside the light guide film to be scattered out of the film to strike the display surface. Such a system usually has a slightly rough surface which may be the display itself that is index matched to the light guide film, or has an array of microprisms specifically designed for this purpose. The display illuminated by the scattered light is viewed by looking through the light guide film.

Such a front lighting system has many disadvantages. First, since the light is strongest at the point of entry into the light guide film, the light tends to fall off in intensity rapidly at points which are further from the illuminating source. To compensate for this, a very complicated light prism structure may be utilized. This light prism structure may have different amounts of scattering near the source and at the points away from the source. Although such a system provides some degree of improvement in lighting uniformity, the uniformity, however, is still unsatisfactory, and the system must be customized for every application. Secondly, since this lighting system is based on scattering phenomenon, any scratch or piece of dirt in the light guide film also scatters the light which shows up as defects. As a result, it is very difficult for such a system to function properly. In addition, if a flexible front light is required, the front light system must be very thin; but a thin front light guide film exacerbates non-uniformity of the light along the length of the light guide film as described above.

SUMMARY OF THE INVENTION

The first aspect of the present invention is directed to a display device assembly which comprises
  a) a display device which comprises display cells filled with a display fluid, and
  b) a mechanical light.

In one embodiment, the assembly may further comprise a luminance enhancement structure.

In one embodiment, the luminance enhancement structure is on the viewing side of the display device and the luminance structure comprises columns and grooves, wherein each of the grooves has a cross-section comprising an apex angle and two edge lines.

In one embodiment, the luminance enhancement structure has a one dimensional configuration.

In one embodiment, the luminance enhancement structure has a two dimensional configuration.

In one embodiment, the two edge lines in the luminance enhancement structure are straight lines and the apex angles of the grooves are substantially equal throughout the structure. In one embodiment, the two edge lines are straight lines and the apex angles of the grooves are not the same throughout the structure.

In one embodiment, each of the two edge lines in the luminance enhancement structure comprises two or more segments of straight line and the different segments of the straight line have different edge line angles.

In one embodiment, the apex angles in the luminance enhancement structure are in the range of about 5° to about 50°. In one embodiment, the apex angles are in the range of about 20° to about 40°.

In one embodiment, the assembly further comprises a common electrode layer and a backplane.

In one embodiment, the mechanical light is a LED light.

In one embodiment, the mechanical light is lock-foldable into the display device.

In embodiment, the mechanical light is extendable and retractable.

In one embodiment, the mechanical light is placed in a position to allow the light emitted from the mechanical light to propagate through the columns of a luminance enhancement structure, if present.

In one embodiment, the grooves and columns are in a vertical direction and the mechanical light is on the top side of a display device.

In one embodiment, the grooves and columns are in a horizontal direction and the mechanical light is on the right or left of a display device.

The present application provides a much simpler and effective way to light up a display device (e.g., e-book) by using a compact light source shining on the display device from a position above it. The mechanical light may be a retractable light source or a light source mounted on a display device, which is foldable into a hidden slot. The improvement in the lighting condition is more pronounced when there is a luminance enhancement structure on the viewing side of the display device.

BRIEF DISCUSSION OF THE DRAWINGS

FIGS. 3b and 3c are three-dimensional view of the luminance enhancement structures.

FIGS. 6a-6g show an example of how a luminance enhancement structure is fabricated.

DETAILED DESCRIPTION OF THE INVENTION

I. Display Devices

Figure 1:
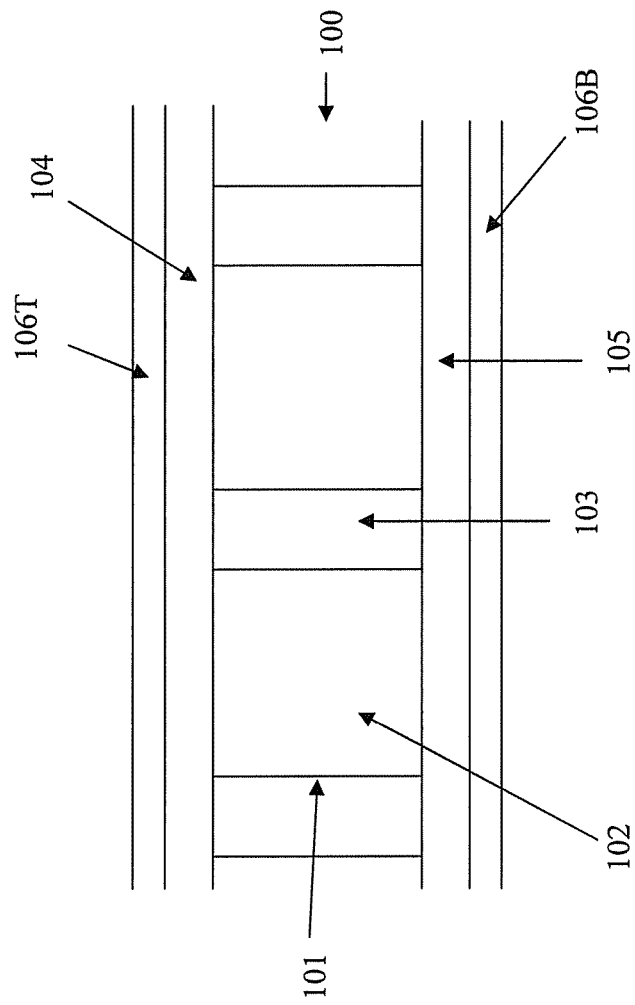
FIG. 1 depicts a cross-section view of a display device.

FIG. 1 illustrates a display device (100). The device comprises display cells (101) which are filled with a display fluid (102) and sandwiched between two electrode layers (104 and 105). Each of the display cells is surrounded by partition walls (103).

For an electrophoretic display, the display cells are filled with an electrophoretic fluid which comprises charged pigment particles dispersed in a solvent. The display fluid may be a system comprising one or two types of particles.

In the system comprising only one type of particles, the charged pigment particles are dispersed in a solvent of a contrasting color. The charged particles will be drawn to one of the electrode layers (104 or 105), depending on the potential difference of the two electrode layers, thus causing the display panel to show either the color of the particles or the color of the solvent, on the viewing side.

In a system comprising particles carrying opposite charges and of two contrasting colors, the particles would move to one electrode layer or the other, based on the charge that they carry and the potential difference of the two electrode layers, causing the display panel to show the two contrasting colors, on the viewing side. In this case, the particles may be dispersed in a clear and colorless solvent.

The display cells may also be filled with a liquid crystal composition. In addition, it is understood that the present invention is applicable to all types of reflective display devices.

For a segment display device, the two electrode layers (104 and 105) are one common electrode (e.g., ITO) and one patterned segment electrode layer, respectively. For an active matrix display device, the two electrode layers (104 and 105) are one common electrode and an array of thin film transistor pixel electrodes, respectively. For a passive matrix display device, the two electrode layers (104 and 105) are two line-patterned electrode layers.

The patterned segment electrode layer (in a segment display device), the thin film transistor pixel electrodes (in an active matrix display device) or one of the two line-patterned electrode layers (in a passive matrix display device) may be referred to as a "backplane", which along with the common electrode drives the display device.

The electrode layers are usually formed on substrate layers (see, for example, 106T and 106B). For segment displays, the backplane is usually a printed circuit board on polyethylene terephthalate (PET). For active matrix displays, the backplane may be glass based or on a flexible substrate such as PET or PEN (polyethylene naphthalate). The uniform electrode layer 104 is usually on a substrate layer which may be a flexible substrate layer.

For a microcup-based display device disclosed in U.S. Pat. No. 6,930,818, the content of which is incorporated herein by reference in its entirety, the filled display cells are sealed with a polymeric sealing layer. Such a display device may be viewed from the sealing layer side or the side opposite the sealing layer side, depending on the transparency of the materials used and the application.

II. Mechanical Light

FIGS. 2a-2f depict different configurations of a mechanical light suitable for a display device.

The mechanical light may be a light emitting diode light source, or a compact halogen lamp or other compact light sources.

Figure 2A:
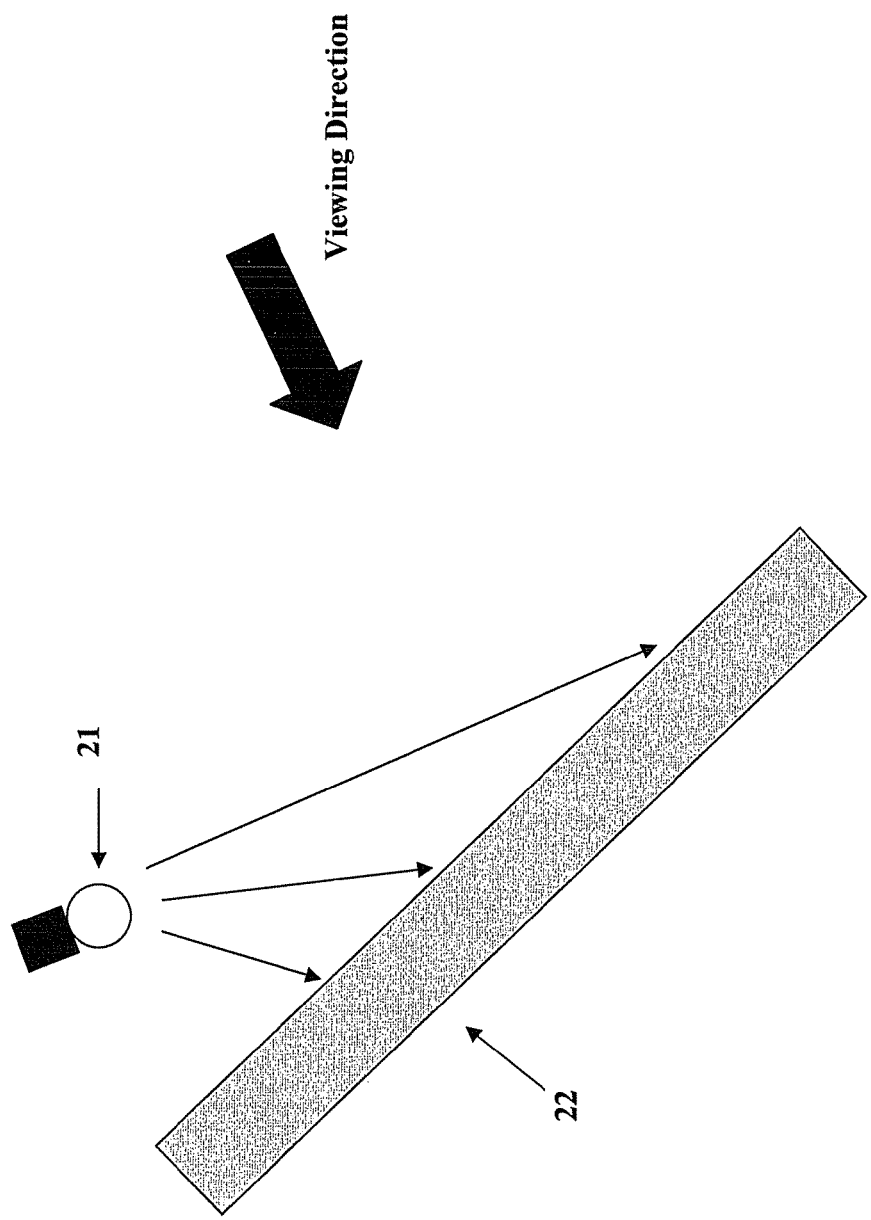
FIGS. 2a-2f depict different configurations of a mechanical light suitable for the present invention.
Figure 2C:
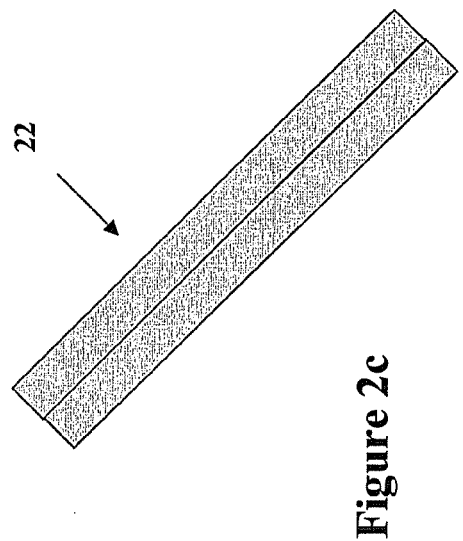

In FIG. 2a, a light source (21) to illuminate a display device (22) is mounted above and away from the display device. In other words, the light source is not physically connected to the display device.

Figure 2B:
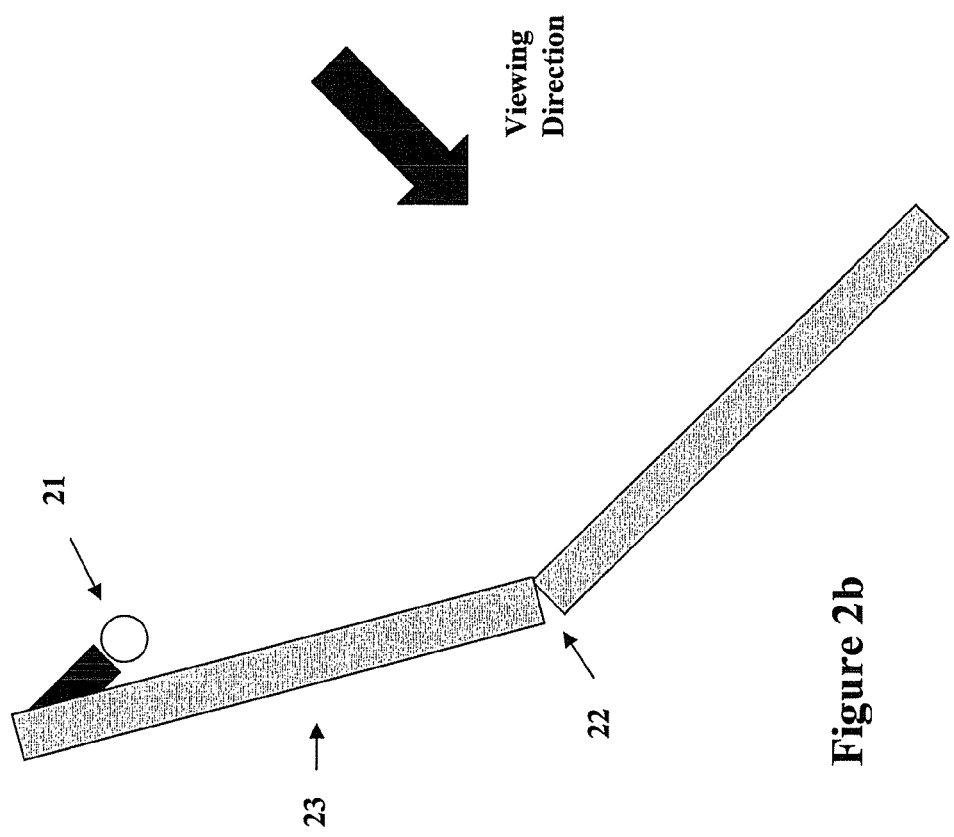

In FIG. 2b, the light source (21) is mounted on the cover (23) of a display device (22). The light source may be lock-folded into the cover when the display device is closed (see FIG. 2c).

Figure 2D:
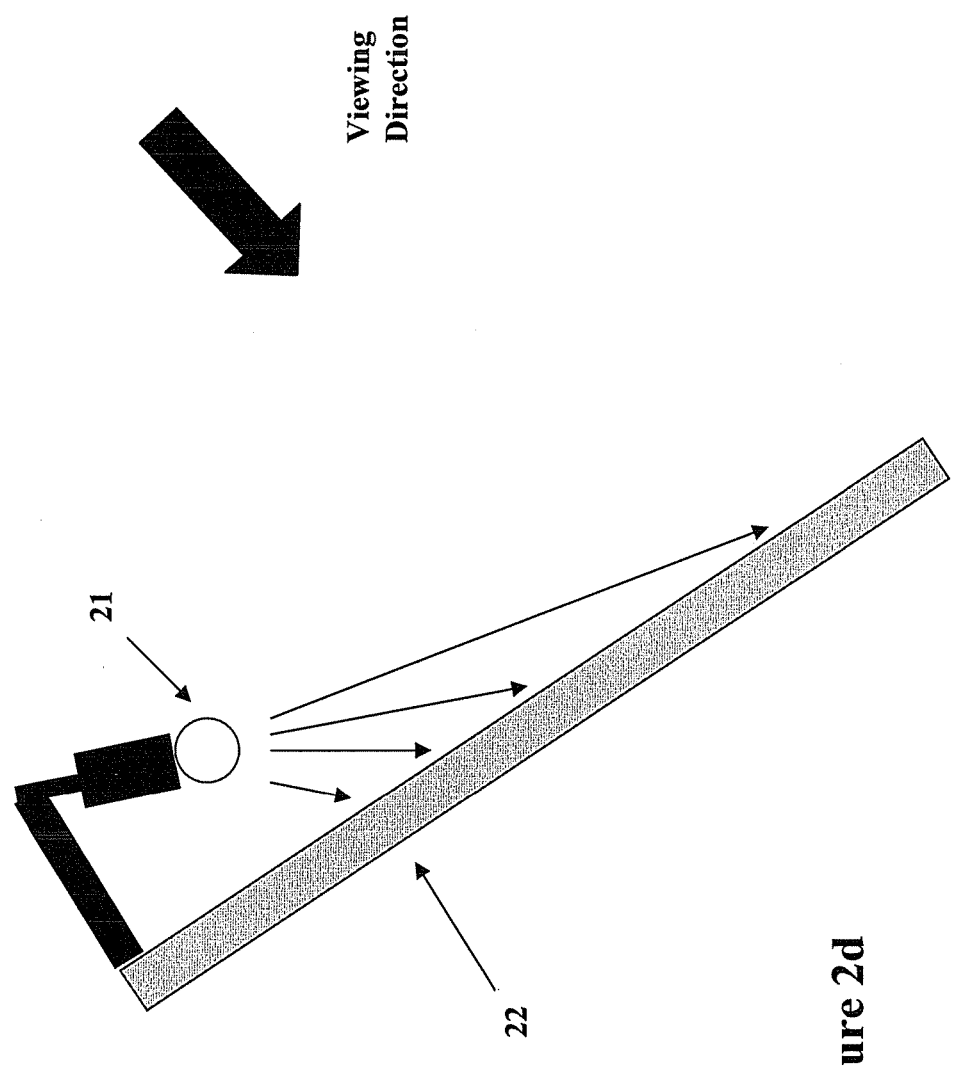
Figure 2E:
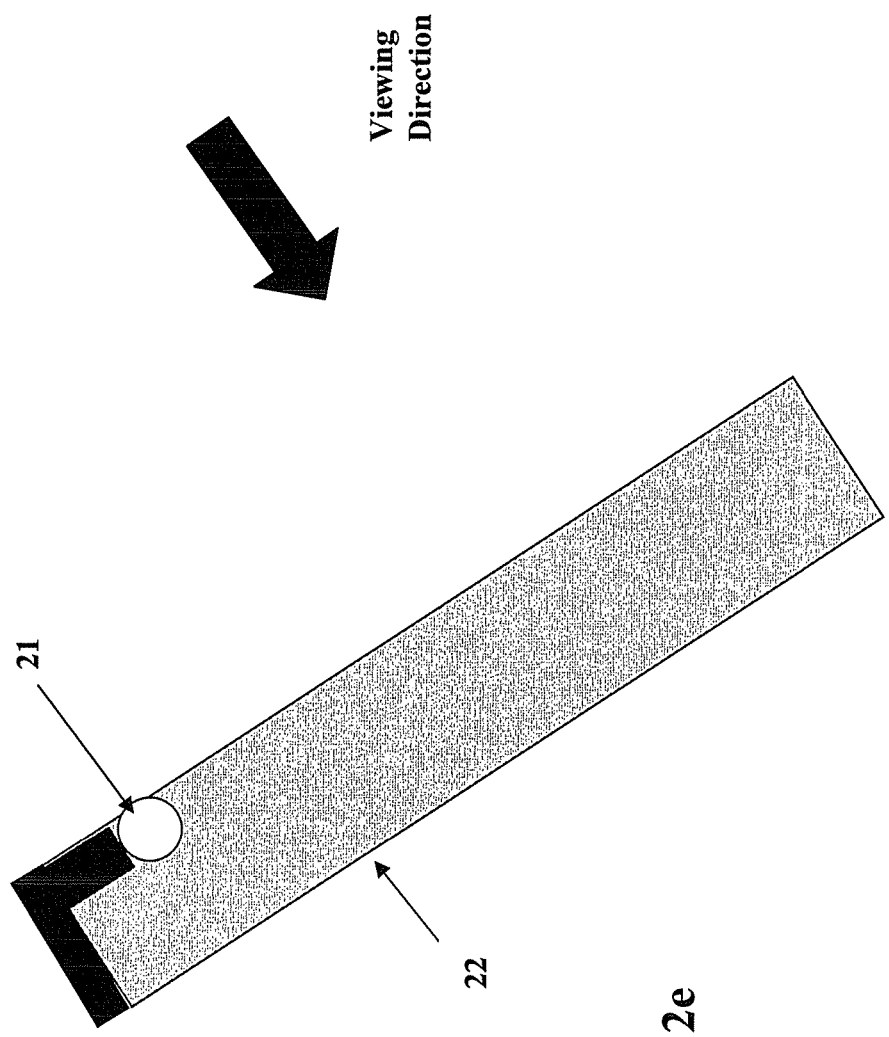

In FIG. 2d, the light source (21) is in an extended position; but it can be retracted back into the display device, as shown in FIG. 2e.

Figure 2F:
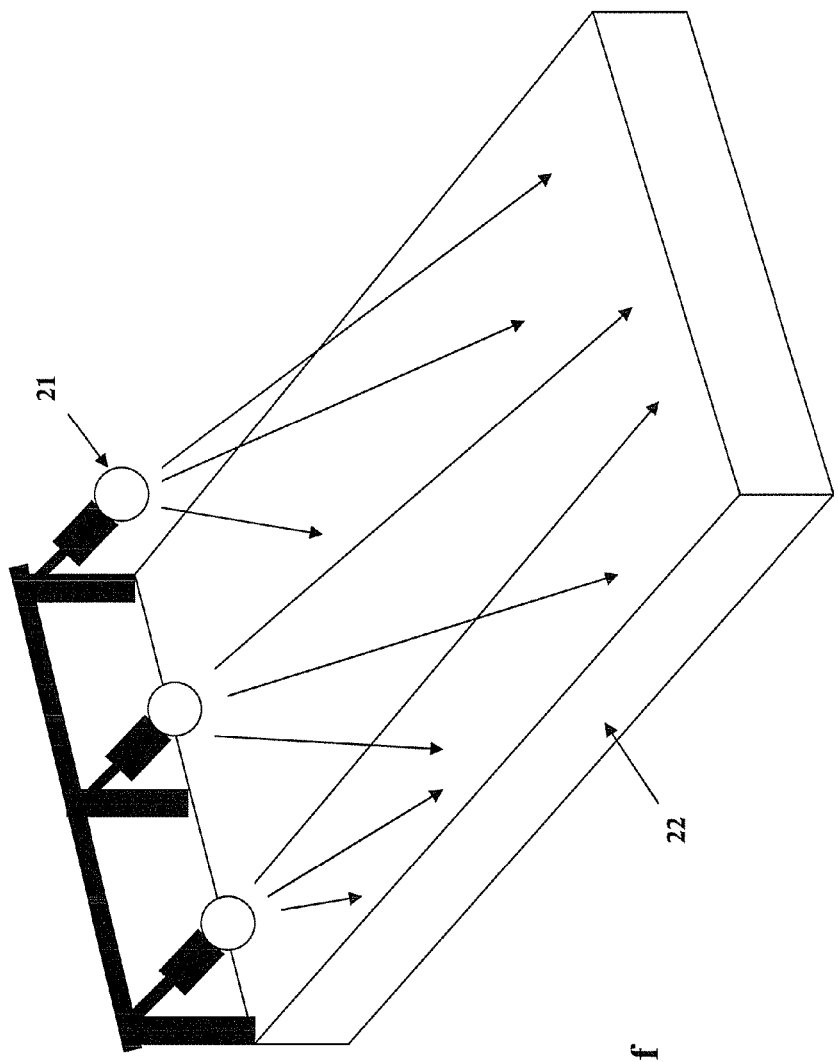

FIG. 2f shows a linear array of light sources (21) which may provide a display device (22) brighter and more uniform illumination.

The lighting configurations as described are particularly useful for electronic books (e-books) having a luminance enhancement structure on the viewing side. The luminance enhancement structure is designed to direct a significant amount of light towards the users.

III. Luminance Enhancement Structure

Figure 3A:
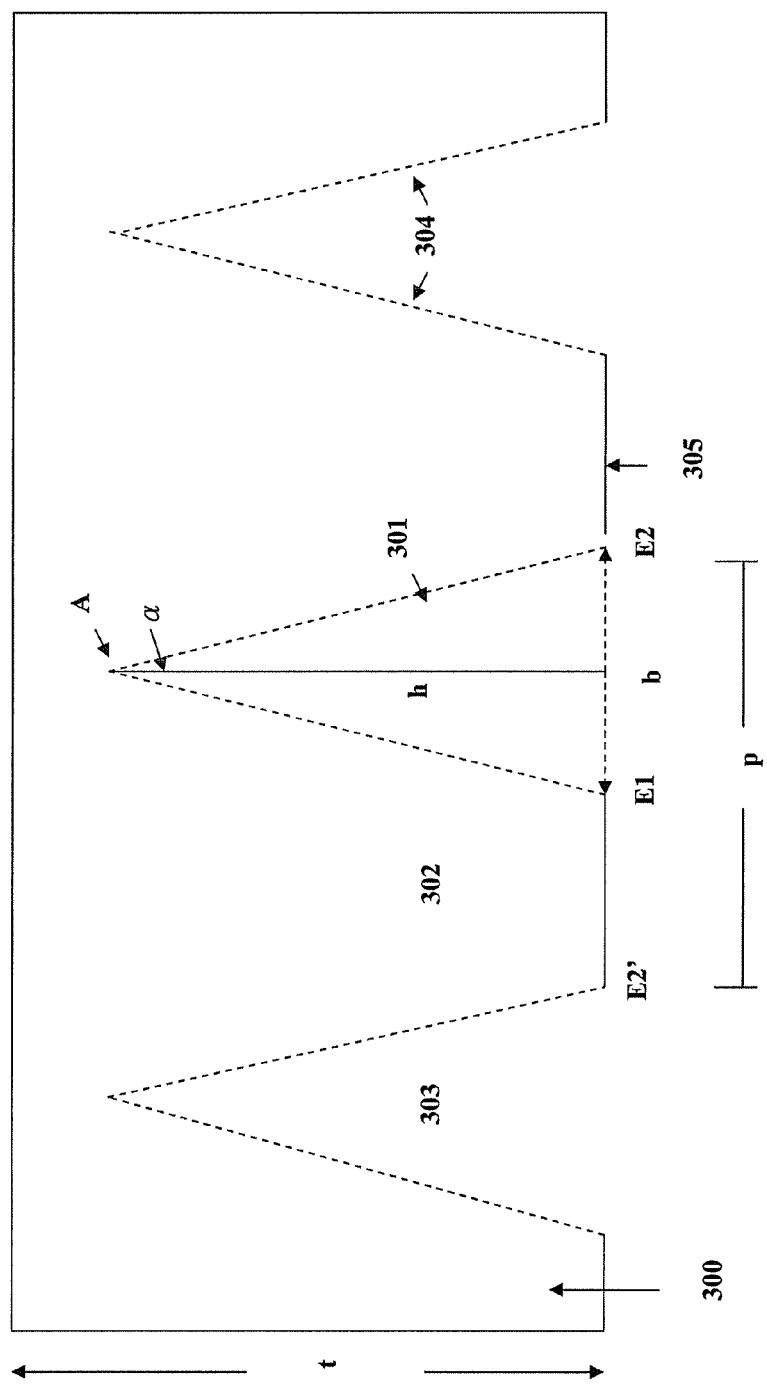
FIG. 3a is a cross-section view of a luminance enhancement structure of the present invention.

The display device assembly of the present invention, as stated, may further comprise a luminance enhancement structure of any kind. FIG. 3a is a cross-section view of an example of a luminance enhancement structure (300) which may be incorporated into the assembly. There are multiple columns (302) and grooves (303) across the structure. The cross-section (301) of the grooves (303) has a top point A and a base line (b). The dotted lines connecting the top point A to the two ends (E1 and E2) of the base line are referred to as "edge lines". The two edge lines form an apex angle α. The dotted line means that the edge line may be a straight line or may comprise two or more segments of straight line. The surface (304) of the grooves (303) is optically flat and optionally coated with a metal layer. In one embodiment, the surface (304) is preferably uncoated.

The columns (302) have a top surface (305). The thickness ("t") of the luminance enhancement structure may be in the range of about 10 μm to about 200 μm.

The luminance enhancement structure is formed from a material having a refractive index of about 1.4 to 1.7. The luminance enhancement structure is transparent.

The fabrication of such a luminance enhancement structure is illustrated in a section below.

Figure 3C:
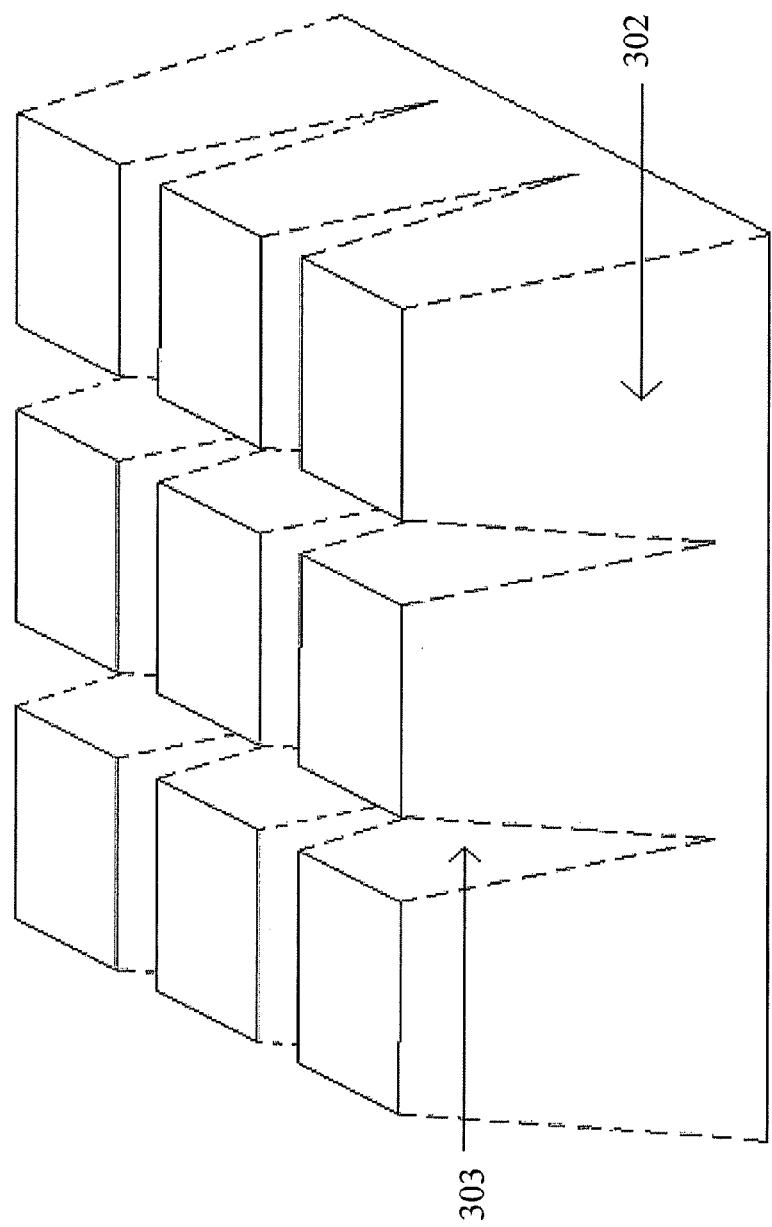

FIG. 3b is a three-dimensional view of the luminance enhancement structure (300) in a one-dimensional configuration (i.e., the columns and grooves are in alternating order and in continuous form in one direction). FIG. 3c is a three-dimensional view of the luminance enhancement structure (300) in a two dimensional configuration.

The luminance enhancement structure may have different structural designs, all of which are within the scope of the present invention.

For example, the two edge lines of the grooves in a luminance enhancement structure may be straight lines and the apex angles (a) are substantially equal for all grooves throughout the structure.

In this first design, the two edge lines of the cross-section may be substantially equal (i.e., isosceles triangular cross-section) for all grooves, or the two edge lines may be substantially equal for some of the grooves and the two edge lines are not equal for the remaining grooves, or the two edge lines may be different for all grooves. The heights "h" of the grooves may be substantially equal throughout the structure or the heights of the grooves may vary. The pitches ("p") of the grooves may be substantially equal for all grooves throughout the structure or the pitches "p" of the grooves may vary. The term "pitch" is defined as the distance between one end point (E2) of the base line (b) of one groove and the corresponding point (E2') of the next groove. In other words, the term "pitch" is the sum of the width of the base line (b) and the width of the top surface of a column between two grooves.

In another design, the two edge lines are straight lines and the apex angles α, however, are not all equal for the grooves. For example, there may be 70% of the apex angles are substantially equal while the remaining apex angles vary. In this second design, the two edge lines of the cross-section may be substantially equal (i.e., isosceles triangular cross-section) for all grooves, or the two edge lines may be substantially equal for some of the grooves and the two edge lines are not equal for the remaining grooves, or the two edge lines may be different for all grooves. The apex angles may have not more than five different sizes throughout the structure. The heights "h" of the grooves may be substantially equal throughout the structure or the heights of the grooves may vary. The pitches ("p") of the grooves may be substantially equal for all grooves throughout the structure or the pitches ("p") of the grooves may vary.

In any case, the grooves of different apex angles are randomly located in the luminance enhancement structure.

The luminance enhancement resulted from different apex angles as described as the second design may be similarly achieved by maintaining the apex angles substantially equal while varying the angles of the edge lines of the grooves. In this third design, each of the edge lines of the cross section may comprise two or more segments of straight line and the different segments of the straight line have different edge line angles. The term "edge line angle" is referred to the angle of α segment of the straight line from the normal axis. In this third design, the apex angles may be maintained substantially equal for all grooves throughout the structure. The apex angles may vary; however, it is not needed. In one example, each edge line is formed of two segments of straight line whereby edge line angle of one segment of straight line is not equal to the edge line angle of another segment of straight line.

It is noted that while the number of the segments increases, the edge lines would appear to be curved. It is also understood that the curved line may consist of more than one curvature, depending on how the segments of the straight line are connected.

In this third design, the two edge lines of a single groove may have different numbers of segments of straight line. For example, one of the edge lines of a groove is formed of two segments of straight line while the other edge line is formed of three segments of straight line. Alternatively, all grooves may have the same set of two edge lines.

In a further design, the columns of the luminance enhancement structure may have wavy edges.

The details of luminance enhancement structure may be found in U.S. Ser. No. 12/323,300 filed on Nov. 25, 2008, U.S. Ser. No. 12/323,315 filed on Nov. 25, 2008, US Publication No. 2009-0231245 published on Sep. 17, 2009, U.S. Ser. No. 61/120,243 filed on Dec. 5, 2008, U.S. Ser. No. 61/144,322 filed on Jan. 13, 2009, U.S. Ser. No. 61/146,552 filed on Jan. 22, 2009 and U.S. Ser. No. 61/158,636 filed on Mar. 9, 2009, the contents of all of which are incorporated herein by reference in their entirety.

Regardless of the configurations, the size of the apex angles throughout this application, is preferably within the range of about 5° to about 50°, preferably of about 20° to about 40°.

In addition, in all of the designs illustrated above, the luminance enhancement structure may be one dimensional (FIG. 3b) or two dimensional (FIG. 3c). However, it is preferable that the structure is one dimensional.

Unless otherwise stated, the term "substantially equal" or "substantially the same" is intended to refer to the fact that the variances for the angles or distances are within the range of manufacturing tolerances.

IV. Display Device Assembly with a Luminance Enhancement Structure

Figure 4:
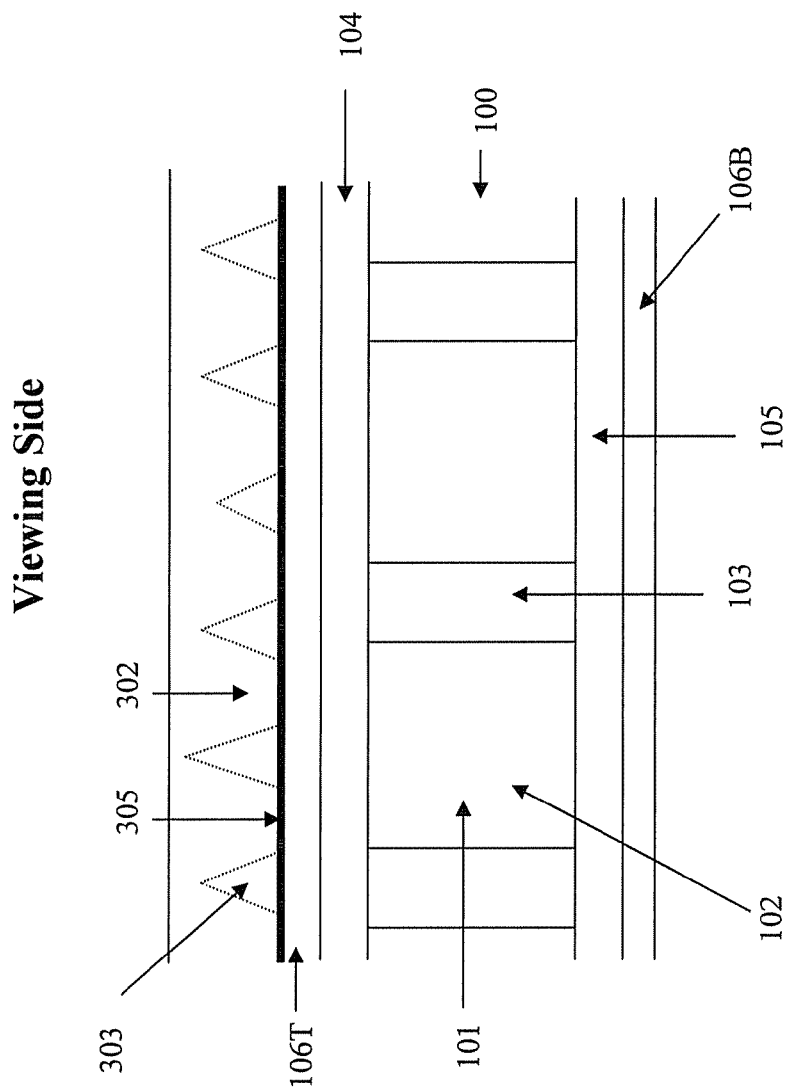
FIG. 4 is a cross-section view of a display device assembly comprising a display device, a luminance enhancement structure and a mechanical light.

FIG. 4 depicts a cross-section view of the luminance enhancement structure on the viewing side of the display device. As shown, the luminance enhancement structure of FIG. 3b has been turned 180°, with the top surface (305) of the columns (302) now in optical contact with the top substrate layer (106T) of the display device, which means that there is no air gap between the top surface 305 and the substrate layer 106T. This may be achieved by an adhesive material, such as the Norland® optical adhesive.

The thickness of the top substrate layer (106T) is usually between about 5 μm to about 175 μm, more preferably between about 1 μm to about 50 μm. In order to achieve the desired effect of the luminance enhancement structure, the top substrate layer is preferably as thin as possible (e.g., about 1 μm to about 25μ). During formation of a display cell layer on a substrate layer, preferably the substrate layer is adhered to a base layer for mechanical strength and the display cells are formed on the side of the substrate layer. After the display cells are formed, the base layer is removed and a luminance enhancement structure is laminated (optionally with an adhesive layer) to the substrate layer to complete the assembly.

Figure 5A:
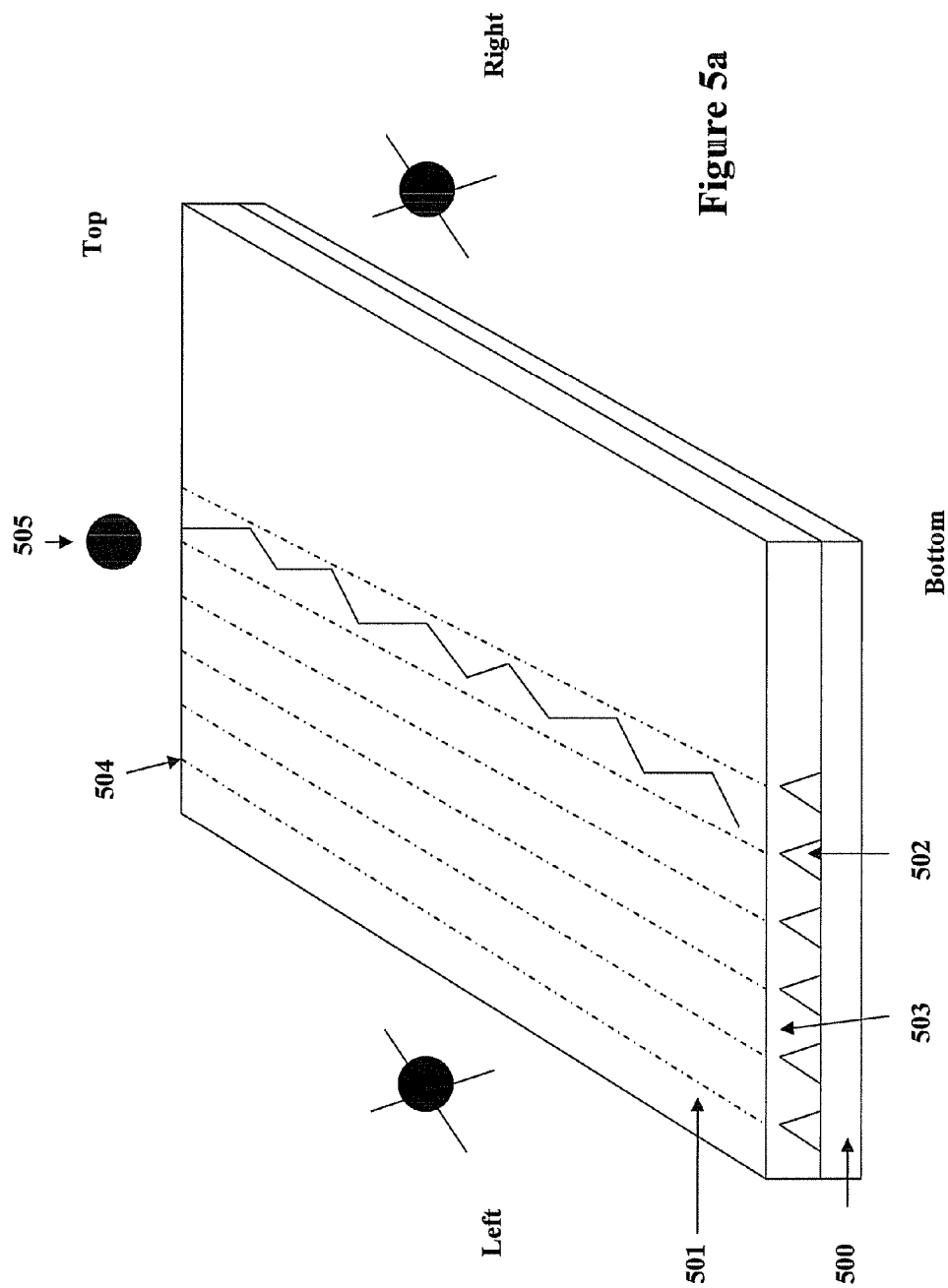
FIGS. 5a & 5b show the preferred positional relationship between a luminance enhancement structure and a mechanical light.
Figure 5B:
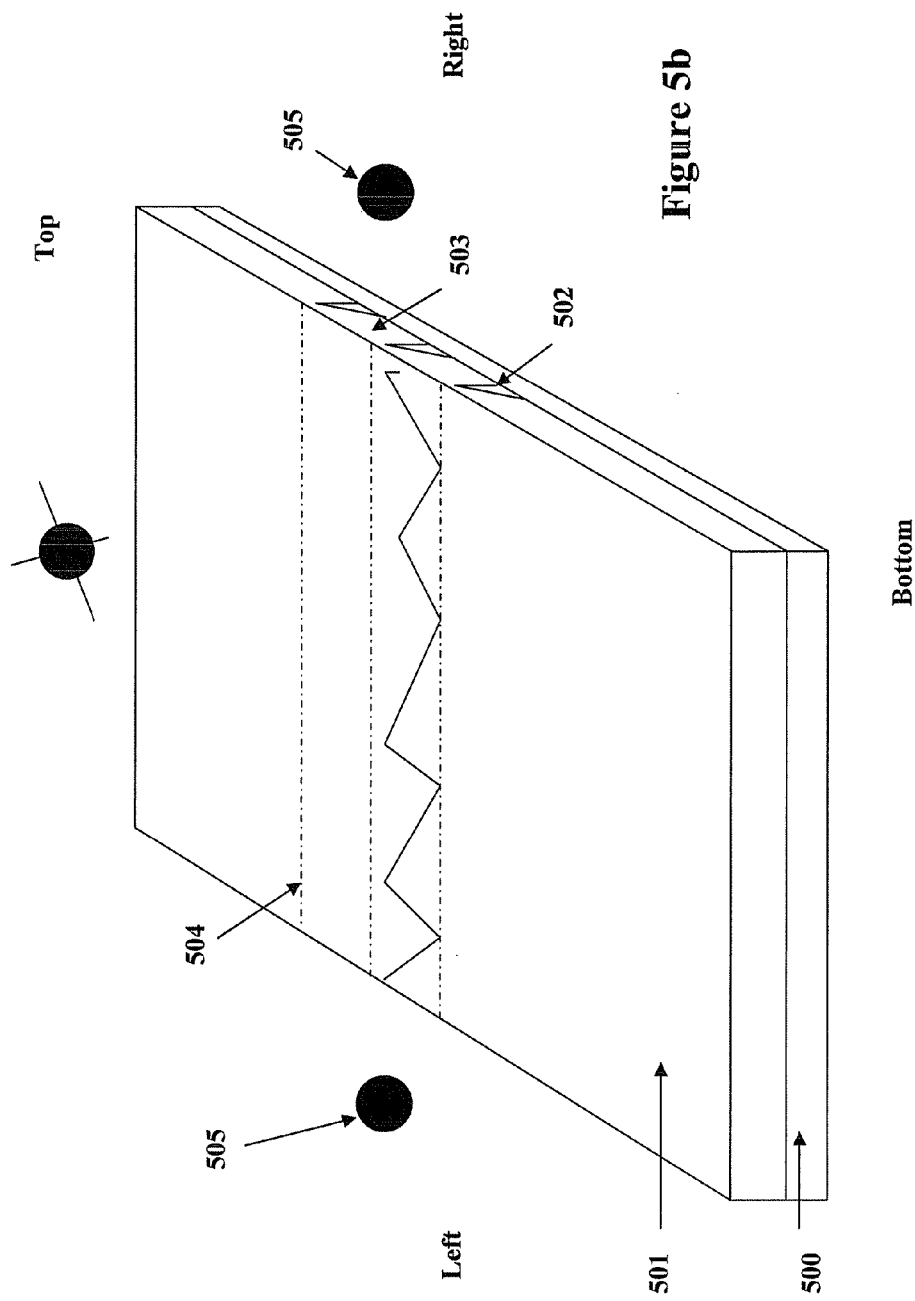

FIGS. 5a and 5b show the preferred positional relationship between a luminance enhancement structure and a mechanical light.

In both figures, a luminance enhancement structure (501) is on the viewing side of a display device (500). The luminance enhancement structure has grooves (502) and columns (503) in a one dimensional configuration. The dotted lines (504) represent the top point of the grooves.

In FIG. 5a, the grooves and columns are in the vertical direction (top to bottom or bottom to top). In this case, a mechanical light (505) is preferably placed in a position which would allow the light emitted from the mechanical light to propagate through the columns (by total internal reflection off the surface of the luminance enhancement structure) in a top to bottom direction. In this case, a light source on the right or left of the display device would not be effective.

In FIG. 5b, the grooves and columns are in the horizontal direction (right to left or left to right). In this case, a mechanical light (505) is preferably placed in a position which would allow the light emitted from the mechanical right to propagate through the columns (by total internal reflection off the surface of the luminance enhancement structure) in a left to right or right to left direction. In this case, a light source on the top of the display device would not be effective.

In both examples, the luminance enhancement structure makes the lighting conditions provided by the mechanical light more uniform.

V. Fabrication of the Luminance Enhancement Structure

The luminance enhancement structure may be fabricated in many different ways.

In one embodiment, the luminance enhancement structure may be fabricated separately and then laminated over the viewing side of the display device. For example, the luminance enhancement structure may be fabricated by embossing as shown in FIG. 6a. The embossing process is carried out at a temperature higher than the glass transition temperature of the embossable composition (600) coated on a substrate layer (601). The embossing is usually accomplished by a mold which may be in the form of a roller, plate or belt. The embossable composition may comprise a thermoplastic, thermoset or a precursor thereof. More specifically, the embossable composition may comprise multifunctional acrylate or methacrylate, multifunctional vinylether, multifunctional epoxide or an oligomer or polymer thereof. The glass transition temperatures (or Tg) for this class of materials usually range from about −70° C. to about 150° C., preferably from about −20° C. to about 50° C. The embossing process is typically carried out at a temperature higher than the Tg. A heated mold or a heated housing substrate against which the mold presses may be used to control the embossing temperature and pressure. The mold is usually formed of a metal such as nickel. The hardening of the embossable composition may be accomplished by cooling, solvent evaporation, cross-linking by radiation, heat or moisture.

The mold is preferably manufactured by the diamond turning technique. Typically the mold is made by diamond turning technique on a cylindrical blank known as a roll. The surface of the roll is typically of hard copper, although other materials may be used. The pattern on the mold (roll) is the opposite of the intended luminance enhancement structure. In other words, the roll will show sharp protruding patterns which are corresponding to the grooves of the luminance enhancement structure. The pattern on the roll is formed in a continuous manner around the circumference of the roll. In a preferred embodiment, the indentations on the surface of the roll are produced by a technique known as thread cutting. In thread cutting, a single, continuous indentation is cut on the roll while the diamond cutter is moved in a direction transverse to the turning roll. If the mold to be produced has a constant pitch, during manufacture of the mold, the roll will move at a constant velocity. A typical diamond turning machine will provide independent control of the depth that the cutter penetrates the roll, the horizontal and vertical angles that the cutter makes to the roll and the transverse velocity of the cutter.

As shown in FIG. 6a, the mold creates the grooves (603) and is released during or after the embossable composition is hardened.

The hardening of the embossable composition may be accomplished by cooling, solvent evaporation, cross-linking by radiation, heat or moisture.

The refraction index of the material for forming the luminance enhancement structure is preferably greater than about 1.4, more preferably between about 1.5 and about 1.7.

The luminance enhancement structure may be used as is or further coated with a metal layer.

The metal layer (607) is then deposited over the surface (606) of the grooves (603) as shown in FIG. 6b. Suitable metals for this step may include, but are not limited to, aluminum, copper, zinc, tin, molybdenum, nickel, chromium, silver, gold, iron, indium, thallium, titanium, tantalum, tungsten, rhodium, palladium, platinum and cobalt. Aluminum is usually preferred. The metal material must be reflective, and it may be deposited on the surface (606) of the grooves, using a variety of techniques such as sputtering, evaporation, roll transfer coating, electroless plating or the like.

In order to facilitate formation of the metal layer only on the intended surface (i.e., the surface 606 of the grooves), a strippable masking layer may be coated before metal deposition, over the surface on which the metal layer is not to be deposited. As shown in FIG. 6c, a strippable masking layer (604) is coated onto the surface (605) between the openings of the grooves. The strippable masking layer is not coated on the surface (606) of the grooves.

The coating of the strippable masking layer may be accomplished by a printing technique, such as flexographic printing, driographic printing, electrophotographic printing, lithographic printing, gravure printing, thermal printing, inkjet printing or screen printing. The coating may also be accomplished by a transfer-coating technique involving the use of a release layer. The strippable masking layer preferably has a thickness in the range of about 0.01 to about 20 microns, more preferably about 1 to about 10 microns.

For ease of stripping, the layer is preferably formed from a water-soluble or water-dispersible material. Organic materials may also be used. For example, the strippable masking layer may be formed from a re-dispersible particulate material. The advantage of the re-dispersible particulate material is that the coated layer may be easily removed without using a solubility enhancer. The term "re-dispersible particulate" is derived from the observation that the presence of particles in the material in a significant quantity will not decrease the stripping ability of a dried coating and, on the contrary, their presence actually enhances the stripping speed of the coated layer.

The re-dispersible particulate consists of particles that are surface treated to be hydrophilic through anionic, cationic or non-ionic functionalities. Their sizes are in microns, preferably in the range of about 0.1 to about 15 um and more preferably in the range of about 0.3 to about 8 um. Particles in these size ranges have been found to create proper surface roughness on a coated layer having a thickness of <15 um. The re-dispersible particulate may have a surface area in the range of about 50 to about 500 $m^2/g$, preferably in the range of about 200 to about 400 $m^2/g$. The interior of the re-dispersible particulate may also be modified to have a pore volume in the range of about 0.3 to about 3.0 ml/g, preferably in the range of about 0.7 to about 2.0 ml/g.

Commercially available re-dispersible particulates may include, but are not limited to, micronized silica particles, such as those of the Sylojet series or Syloid series from Grace Davison, Columbia, Md., USA.

Non-porous nano sized water re-dispersible colloid silica particles, such as LUDOX AM can also be used together with the micron sized particles to enhance both the surface hardness and stripping rate of the coated layer.

Other organic and inorganic particles, with sufficient hydrophilicity through surface treatment, may also be suitable. The surface modification can be achieved by inorganic and organic surface modification. The surface treatment provides the dispensability of the particles in water and the re-wetability in the coated layer.

In FIG. 6d, a metal layer (607) is shown, to be deposited over the entire surface, including the surface (606) of the grooves and the surface (605) between the grooves. Suitable metal materials are those as described above. The metal material must be reflective and may be deposited by a variety of techniques previously described.

Figure 6E:
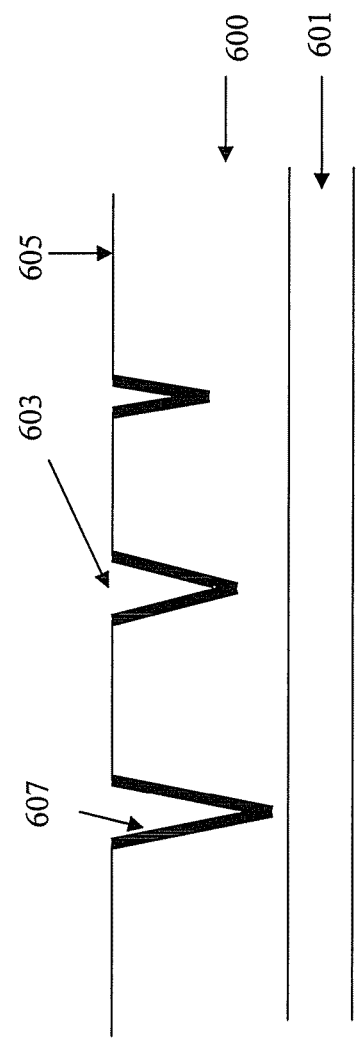

FIG. 6e shows the structure after removal of the strippable masking layer (604) with the metal layer (607) coated thereon. This step may be carried out with an aqueous or non-aqueous solvent such as water, MEK, acetone, ethanol or isopropanol or the like, depending on the material used for the strippable masking layer. The strippable masking layer may also be removed by mechanical means, such as brushing, using a spray nozzle or peeling it off with an adhesive layer. While removing the strippable masking layer (604), the metal layer (607) deposited on the strippable masking layer is also removed, leaving the metal layer (607) only on the surface (606) of the grooves.

Figure 6F:
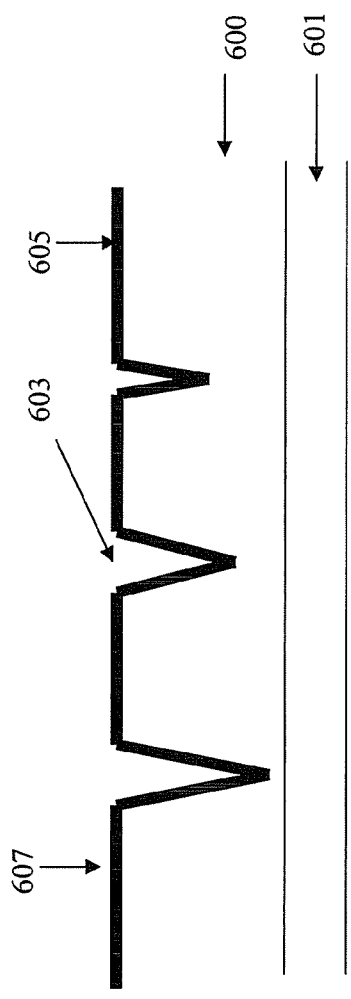
Figure 6G:
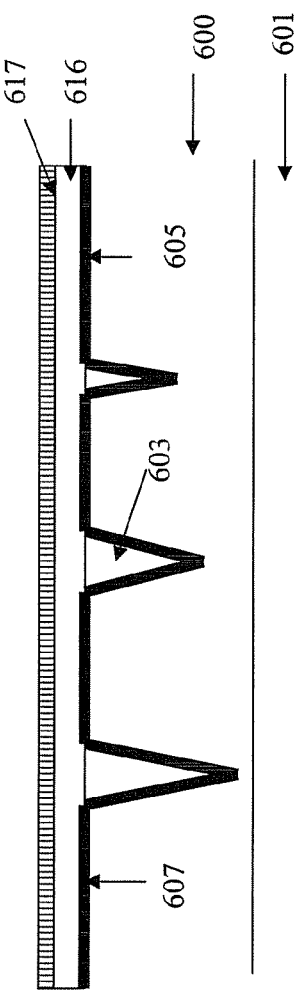

FIGS. 6f and 6g depict an alternative process for depositing the metal layer. In FIG. 6f, a metal layer (607) is deposited over the entire surface first, including both the surface (606) of the grooves and the surface (605) between the grooves. FIG. 6g shows that the film of grooves deposited with a metal layer (607) is laminated with a film (617) coated with an adhesive layer (616). The metal layer (607) on top of the surface (605) may be conveniently peeled off when the film of grooves is delaminated (separated) from the adhesive layer (616) coated film (617). The thickness of the adhesive layer (616) on the adhesive coated film is preferably in the range of about 1 to about 50 um and more preferably in the range of about 2 to about 10 um.

The luminance enhancement structure comprising grooves (uncoated or coated with a metal layer) is then laminated over a layer of display cells as described above.

For a two dimensional luminance enhancement structure, it may be manufactured by a self-aligned process as disclosed in U.S. Ser. No. 12/323,300 filed on Nov. 25, 2008, the content of which is incorporated herein by reference in its entirety. In the self-aligned process, the display cells are formed by a photolithography process, utilizing the luminance enhancement structure as a photomask.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, materials, compositions, processes, process step or steps, to the objective, spirit and scope of the present invention. All such modifications are intended to be within the scope of the claims appended hereto.

What is claimed is:

1. A display device assembly comprising:
   a) a display device which comprises
      (i) a top substrate layer on the viewing side of the display device, and
      (ii) display cells filled with a display fluid,
   b) a luminance enhancement structure comprising columns and grooves in an alternating order in a continuous form, and in only one direction, wherein each of said columns has a top surface which is in contact with the top substrate layer of the display device, and
   c) a mechanical light which is placed in a position to allow the light emitted from the mechanical light to propagate through the columns of the luminance enhancement structure.

2. The assembly of claim 1, wherein each of said grooves has a cross-section comprising an apex angle and two edge lines.

3. The assembly of claim 2, wherein said two edge lines are straight lines and the apex angles of the grooves are substantially equal throughout the structure.

4. The assembly of claim 2, wherein said two edge lines are straight lines and the apex angles of the grooves are not the same throughout the structure.

5. The assembly of claim 2, wherein each of the two edge lines comprises two or more segments of straight line and the different segments of the straight line have different edge line angles.

6. The assembly of claim 2, wherein said apex angle is in the range of about 5° to about 50°.

7. The assembly of claim 6, wherein said apex angle is in the range of about 20° to about 40°.

8. The assembly of claim 1, further comprising a common electrode layer and a backplane.

9. The assembly of claim 1, wherein said mechanical light is a LED light.

10. The assembly of claim 1, wherein said mechanical light is lock-foldable into the display device.

11. The assembly of claim 1, wherein said mechanical light is extendable and retractable.

12. The assembly of claim 1, wherein said grooves and columns are in a vertical direction and the mechanical light is on the top side of the display device.

13. The assembly of claim 1, wherein said grooves and columns are in a horizontal direction and the mechanical light is on the right or left side of the display device.

* * * * *